(12) United States Patent
Kim

(10) Patent No.: US 12,086,497 B2
(45) Date of Patent: Sep. 10, 2024

(54) DISPLAY DEVICE WITH COMBINATION OF MULTIPLE DISPLAY SYSTEMS, CONTROL METHOD OF THE SAME, AND GAME MACHINE EQUIPPED WITH THE SAME

(71) Applicant: TOVIS CO., LTD., Incheon (KR)

(72) Inventor: Yong Beom Kim, Incheon (KR)

(73) Assignee: TOVIS CO., LTD., Incheon (KR)

( * ) Notice: Subject to any disclaimer, the term of this patent is extended or adjusted under 35 U.S.C. 154(b) by 343 days.

(21) Appl. No.: 17/632,794

(22) PCT Filed: Jul. 17, 2020

(86) PCT No.: PCT/KR2020/009454
§ 371 (c)(1),
(2) Date: Feb. 4, 2022

(87) PCT Pub. No.: WO2021/025326
PCT Pub. Date: Feb. 11, 2021

(65) Prior Publication Data
US 2022/0276821 A1 Sep. 1, 2022

(30) Foreign Application Priority Data
Aug. 6, 2019 (KR) .................. 10-2019-0095512

(51) Int. Cl.
*G09G 5/00* (2006.01)
*G06F 3/14* (2006.01)
(Continued)

(52) U.S. Cl.
CPC ............ *G06F 3/1446* (2013.01); *G06F 3/147* (2013.01); *G07F 17/3211* (2013.01)

(58) Field of Classification Search
CPC ...... G06F 3/1431; G06F 3/1446; G06F 3/147; G09G 3/32; G09G 3/36; G09G 2300/026;
(Continued)

(56) References Cited

U.S. PATENT DOCUMENTS

2008/0297591 A1 12/2008 Aarts et al.
2011/0162031 A1 6/2011 Weon et al.
(Continued)

FOREIGN PATENT DOCUMENTS

JP 2012-058475 A 3/2012
JP 2013-542454 A 11/2013
(Continued)

OTHER PUBLICATIONS

Extended European Search Report of European Patent Application No. 20850446 mailed Jan. 10, 2023.
(Continued)

*Primary Examiner* — Joe H Cheng
(74) *Attorney, Agent, or Firm* — Revolution IP, PLLC

(57) ABSTRACT

A display device of the present invention includes: a first display unit that displays an image in a first display mode; a second display unit that displays an image in a second display mode different from the first display mode; and a control unit that controls operations of the first display unit, and the second display unit in accordance with a preset control condition.

15 Claims, 7 Drawing Sheets

(51) Int. Cl.
*G06F 3/147* (2006.01)
*G07F 17/32* (2006.01)

(58) Field of Classification Search
CPC .......... G09G 2340/0407; G09F 9/3026; G09F 23/14; A63F 13/90; G07F 17/3211
See application file for complete search history.

(56) References Cited

U.S. PATENT DOCUMENTS

| | | | |
|---|---|---|---|
| 2012/0056902 | A1 | 3/2012 | Yoshino |
| 2012/0068976 | A1* | 3/2012 | Chang ................... G06F 3/1423 345/204 |
| 2013/0072309 | A1 | 3/2013 | Han, II et al. |
| 2015/0049120 | A1* | 2/2015 | He .......................... G02B 27/01 345/660 |
| 2016/0163018 | A1 | 6/2016 | Wang et al. |
| 2016/0321969 | A1 | 11/2016 | Kambhatla |
| 2018/0060013 | A1* | 3/2018 | Son ....................... G06F 3/1446 |

FOREIGN PATENT DOCUMENTS

| | | |
|---|---|---|
| KR | 10-1998-0037135 A | 8/1998 |
| KR | 10-2011-0074074 A | 6/2011 |
| KR | 10-2011-0132680 A | 12/2011 |
| KR | 10-2017-0113926 A | 10/2017 |
| KR | 10-2018-0134215 A | 12/2018 |

OTHER PUBLICATIONS

International Search Report for PCT/KR2020/009454 mailed Oct. 15, 2020 from Korean Intellectual Property Office.
Display Hub. Mixed Use of LED Billboard+ LCD(DID). vimeo.com [online][video]. Apr. 28, 2016. [Retrieved on Oct. 6, 2020]. Retrieved from: <https://vimeo.com/164538756>.

* cited by examiner

DISPLAY DEVICE WITH COMBINATION OF MULTIPLE DISPLAY SYSTEMS, CONTROL METHOD OF THE SAME, AND GAME MACHINE EQUIPPED WITH THE SAME

CROSS REFERENCE TO PRIOR APPLICATIONS

This application is the 35 U.S.C. 371 national stage of International application PCT/KR2020/009454 filed on Jul. 17, 2020 which claims priority to Korean application 10-2019-0095512 filed on Aug. 6, 2019. The entire contents of each of the above-identified applications are hereby incorporated by reference.

TECHNICAL FIELD

The present invention relates to a display device, and more specifically, to a display device with a combination of multiple display systems, a control method of the same, and a game machine equipped with the same.

BACKGROUND ART

In general, a display device which is a device that outputs an image receives an image source from image equipment and outputs an image.

Since the display device can display various images, the display device outgrows a purpose of simply viewing an image and is widely used in various fields of industry.

An example of the display device being used is a game machine, and various methods for improving a visual effect of the game machine have been proposed in order to increase a degree of participation in a game. This is because visual splendor provided to a game machine increases the degree of participation in a game. For example, there is provided a method or the like of increasing the degree of participation in a game by providing a light emitting diode (LED) module (hereinafter, referred to as a 'module') around a display panel, diffusing light of the LED module through an optical waveplate such that light is emitted from an edge of the optical waveplate, and adding visual splendor due to light.

Incidentally, when a game machine has a visually splendid screen in order to increase the degree of participation in a game as described above, a visual effect can be improved; on the other hand, shortcomings appear in that an afterimage remains on a display by continuously displaying the visually splendid screen, or the screen of the game machine is degraded and thus a service lift of the display is shortened.

SUMMARY OF INVENTION

Technical Problem

Hence, objects of the present invention are to provide a display device with a combination of multiple display systems, a control method of the same, and a game machine equipped with the same, the display device with a combination of multiple display systems being capable of having various operation modes and displaying various images by enabling individual display regions of the multiple display systems to be integrated and one image to be displayed in the integrated region.

In addition, objects of the present invention are to provide a display device with a combination of multiple display systems, a control method of the same, and a game machine equipped with the same, the display device with a combination of multiple display systems being capable of extending a service life of a display by minimizing degradation of a screen of the game machine while maintaining a visually splendid screen of the game machine, by enabling multiple display systems to display various images without fixedly displaying only respective designated images.

In addition, objects of the present invention are to provide a display device, a control method of the same, and a game machine equipped with the same, the display device with a combination of multiple display systems minimizing a phenomenon in which an afterimage remains on a display such that display performance of the display is improved, by enabling various images to be displayed in various operation modes.

Solution to Problem

In order to achieve the objects, a display device according to the present invention includes: a first display unit that displays an image in a first display mode; a second display unit that displays an image in a second display mode different from the first display mode; and a control unit that controls operations of the first display unit, and the second display unit in accordance with a preset control condition. The control unit controls the display device to be operated in one mode of a first operation mode of displaying different images designated to the respective first and second display units on the corresponding display units, respectively, or a second operation mode of displaying one image in a first integrated region which integrates display regions of the first and second display units.

Preferably, the control unit may control an operation to be performed in the second operation mode when a preset specific event occurs.

Preferably, the display device may further include a human body detecting sensor that determines whether or not a human is present in a close distance, and the control unit may control an operation to be performed in the second operation mode when the human body detecting sensor does not detect a human.

Preferably, the first display unit may display an image in an LCD mode, and the second display unit may display an image in an LED mode.

Preferably, when resolution of the first display unit is n times the resolution of the second display unit, the control unit may control pixels of the first display unit to be displayed in one pixel by forming bundles of n×n pixels, in order to control an operation to be performed in the second operation mode (here, n is a positive integer equal to or larger than 1).

Preferably, the display device may further include: an image storing unit that stores at least one item of image information which is to be displayed simultaneously using the first and second display units; and an image processing unit that detects an image which is to be displayed on the first and second display units from the image storing unit and displays the image.

Preferably, the (m−1) display devices may be further included, the m display devices may be arranged in an a×b arrangement, and the control unit may control the m display devices to be operated in a third operation mode of displaying one image in a second integrated region which integrates at least two contiguous display regions of the respective display devices, the display devices being operated in the second operation mode (here, a, b, and m are natural numbers).

Preferably, the image storing unit may store: at least one different individual items of image information which are to be displayed on each of the first and second display units, when the display device is operated in the first operation mode; and at least one item of first integrated image information which is to be displayed in the first integrated region when the display device is operated in the second operation mode.

Preferably, when the display device is operated in the second operation mode, the control unit may sequentially or randomly select two or more items of the first integrated image information every predetermined time and may display the first integrated image information in the first integrated region.

Preferably, when the display device is operated in the third operation mode, the control unit may sequentially or randomly select two or more items of the second integrated image information every predetermined time and may display the second integrated image information in the second integrated region.

Meanwhile, in order to achieve the objects, in a display method according to the present invention, there is provided a control method of a display device including first and second display units which display images in respective display modes different from each other, the control method including: a step 1 of displaying different images designated to the respective first and second display units on the corresponding display units, respectively; a step 2 of determining whether or not a preset specific event occurs; a step 3 of setting a first integrated region which integrates the first and second display units when the specific event occurs; and a step 4 of displaying one preset image in the first integrated region.

Preferably, when the first and second display units have different resolution from each other, the step 3 may further include a step 3-1 of processing pixels of the display unit having higher resolution to form a bundled pixel.

Preferably, in the step 4, two or more images may be sequentially or randomly selected and displayed every predetermined time.

In addition, in order to achieve the objects, a game machine according to the present invention includes: a display device including first and second display units which display images in respective display modes different from each other; an image storing unit that stores at least one item of image information which is to be displayed on the display device; a game-machine body on which the display device is mounted; and a manipulation mechanism that is installed in the game-machine body and generates a manipulation signal for manipulating a game displayed on the display device. The display device is operated in one mode of a first operation mode of displaying different images designated to the respective first and second display units on the corresponding display units, respectively, or a second operation mode of displaying one image in a first integrated region which integrates the first and second display units.

Preferably, the game machine may include a plurality of the display devices, and the display devices may be vertically and contiguously arranged, and each of the display devices is operated in one mode of the first operation mode or the second operation mode.

Advantageous Effects of Invention

According to a display device provided in the present invention, in a display device with a combination of multiple display systems, display regions of the multiple display systems can be integrated such that one image can be displayed in the integrated region, by changing an operation mode of a display when a specific event occurs, and thereby various images can be displayed without fixedly displaying only images designated to the multiple display systems, respectively. As a result, the display device of the present invention has an advantage of minimizing the degradation of a screen of a game machine such that a service life of a display can be extended even while the screen of the game machine is maintained splendidly. In addition, the display device of the present invention has an advantage of minimizing a phenomenon in which an afterimage remains on the display such that display performance of the display is improved, by enabling various images to be displayed with various operation modes. According to a display device including multiple display systems having different resolution, the present invention has an advantage of enabling a screen to be watched without awkwardness by processing pixels of the display system having higher resolution to form a bundled pixel so as to overcome a difference in resolution between the display systems.

PREFERRED EMBODIMENTS FOR CARRYING OUT THE INVENTION

Hereinafter, embodiments of the present invention will be described with reference to the accompanying drawings and will be described in detail to the extent that a person with ordinary knowledge in the art to which the invention pertains can easily embody the present invention. However, the present invention can be realized as various different examples, and thus is not limited to embodiments described here. Meanwhile, a part irrelevant to the description is omitted from the drawings in order to clearly illustrate the present invention, and similar reference signs are assigned to similar parts through the entire specification. In addition, the description of a part which can be easily understood by those skilled in the art without detailed description is omitted.

In the entire specification and claims, when a certain part "comprises" a certain configurational element, this means that another configurational element is not excluded but can be further included unless specifically described otherwise.

Figure 1:
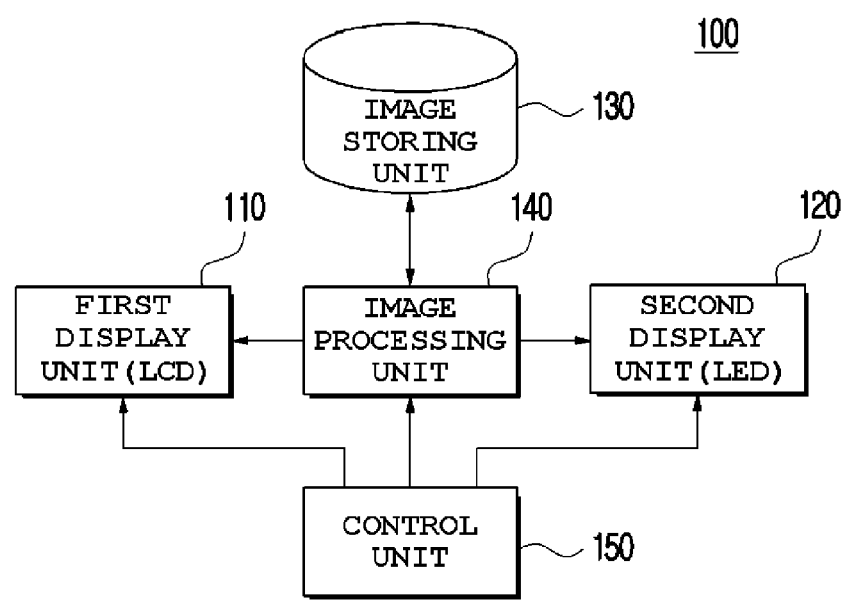
FIG. 1 is a schematic block diagram of a display device according to an embodiment of the present invention.

FIG. 1 is a schematic block diagram of a display device according to an embodiment of the present invention. With reference to FIG. 1, a display device 100 according to the embodiment of the present invention includes a first display unit 110, a second display unit 120, an image storing unit 130, an image processing unit 140, and a control unit 150.

The first display unit 110 and the second display unit 120 display images desired to be output through the display device 100.

The first display unit 110 and the second display unit 120 display images in different modes from each other. For example, the first display unit 110 can display an image in a liquid crystal display (LCD) mode, and the second display unit 120 can display an image in a light emitting diode (LED) mode. The second display unit 120 can be realized in a shape of having a predetermined width and surrounding an edge of the first display unit 110 and can be realized to emit light toward a front surface portion.

Figure 2:
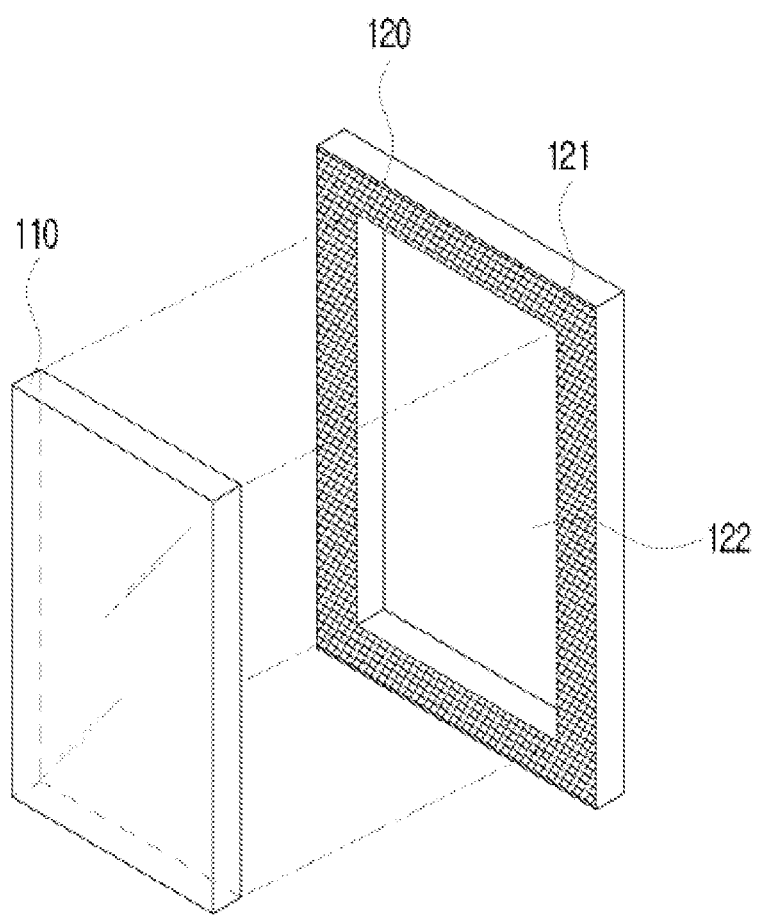
FIG. 2 is a side-end view of the display device according to the embodiment of the present invention.

FIG. 2 is a side-end view of the display device according to the embodiment of the present invention. A combination structure of the first and second display units 110 and 120 are illustrated.

With reference to FIG. 2, the second display unit 120 is provided on an outer side of the first display unit 110. The first display unit 110 is a display device which realizes a display as a whole, similarly to LCD, OLED, or the like, and the second display unit 120 is a display device which is realized as an assembly of LED elements which individually emit light.

The second display unit 120 includes an LED module 121 at an edge of the second display unit, the LED module emitting light toward the front surface portion.

In the embodiment, the second display unit 120 can have a hole 122 into which the first display unit 110 is inserted, at the center of the second display unit, the first display unit being realized by an LCD panel. Hence, the first display unit 110 is inserted into the hole 122, and thereby the first and second display units 110 and 120 can be combined.

The first and second display units 110 and 120 combined by the structure described above can display different images designated to the respective display units through control performed by the control unit 150 or can be operated to display one image in a first integrated region which integrates display regions of the first and second display units 110 and 120.

For example, a display surface of the first display unit 110 and a display surface of the second display unit 120 can be combined to be flush with or contiguous to each other.

The image storing unit 130 stores at least one item of image information which is to be displayed through the first and second display units 110 and 120. For example, the image storing unit 130 can store one or more different individual items of image information which are to be displayed on each of the first and second display units 110 and 120 and at least one item of first integrated image information which is to be displayed in the first integrated region.

The image processing unit 140 detects an image which is to be displayed on the first and second display units 110 and 120 from the image storing unit 130 and displays the image thereon.

The control unit 150 controls operations of the first display unit 110, the second display unit 120, and the image processing unit 140 in accordance with a preset control condition.

The control unit 150 can control an operation mode of the display device 100 by controlling the operations of the first display unit 110, the second display unit 120, and the image processing unit 140. For example, the control unit 150 controls the display device 100 to be operated in one mode of a 'first operation mode' of displaying different images designated to the respective first and second display units 110 and 120 on the first and second display units 110 and 120, respectively, or a 'second operation mode' of displaying one image in the first integrated region which integrates the display regions of the first and second display units 110 and 120.

In the embodiment, the control unit 150 can control the display device 100 to be operated in the first operation mode and display individual images, and operated in the second operation mode and display an integrated image only when a preset specific event occurs.

In this case, when the display device 100 is mounted on a game machine, the 'preset specific event' can be an event (for example, jackpot or the like) which can occur according to an operation state of a corresponding game. As a result, the display device 100 can display not a general game screen but a screen or the like for congratulating the corresponding event (for example, jackpot or the like).

In the embodiment, the control unit 150 can control the display device 100 to be operated in the second operation mode and display an integrated image even when a human is not present at a close distance to the display device 100. As a result, when the display device 100 is mounted on the game machine, there is an effect of attracting attention of a user who passes by and causing the user to participate in a game by displaying a screen which is not a game screen (for example, a game promotion screen or the like). In this respect, preferably, the display device 100 further includes a human body detecting sensor (not illustrated) that determines whether or not a human is present in a close distance, and the control unit 150 controls an operation mode of the display device 100 based on a sensing result transmitted from the human body detecting sensor.

Figure 3:
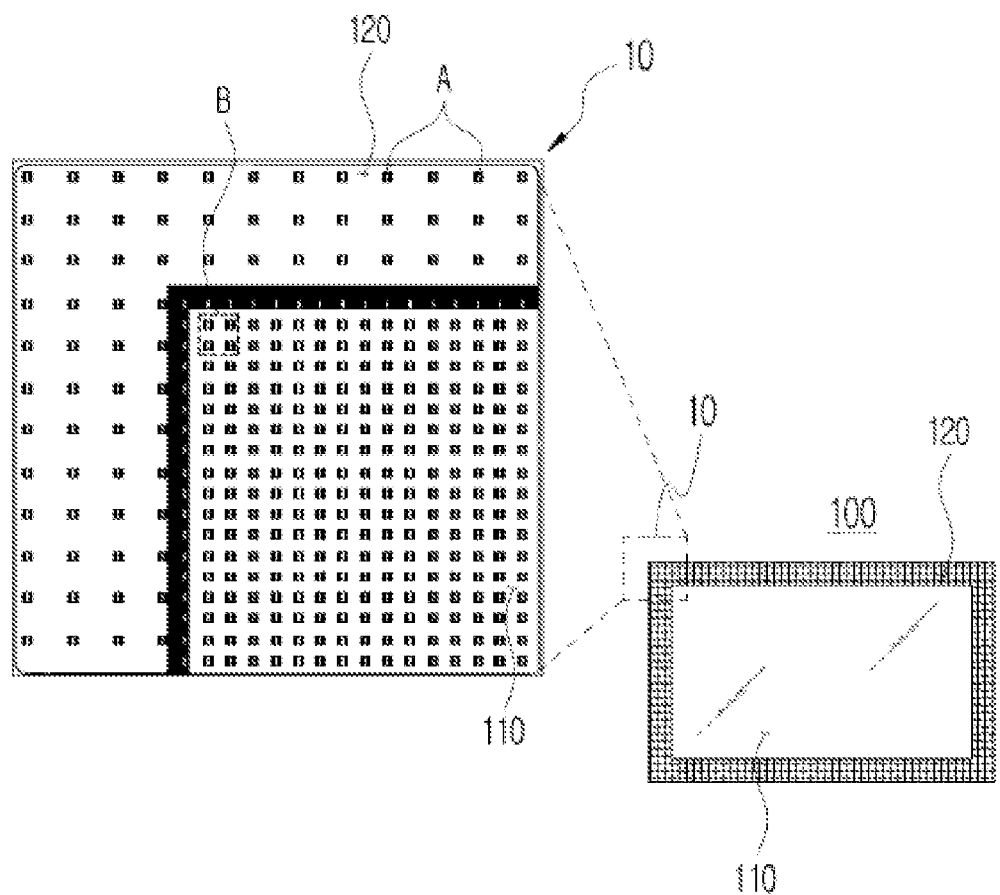
FIG. 3 is a view for illustrating resolution of the display device according to the embodiment of the present invention.

Meanwhile, when the display device 100 is operated in the second operation mode, a difference in resolution between the first and second display units 110 and 120 has to be decreased in order to display one integrated image in the display region of the first and second display units 110 and 120 having respective display modes different from each other. In other words, when the first display unit 110 displays an image in the LCD mode and the second display unit 120 displays an image in the LED mode, the first display unit 110 has the relatively higher resolution, and thus the resolution has to be lowered. In this respect, preferably, the control unit 150 processes pixels of the display unit having the higher resolution to form a bundled pixel. For example, when the resolution of the first display unit 110 is n times the resolution of the second display unit 120, the control unit 150 can control pixels of the first display unit 110 to be displayed in one pixel by forming bundles of n×n pixels. In this case, n is a positive integer equal to or larger than 1. FIG. 3 is a view for illustrating resolution of the display device according to the embodiment of the present invention and illustrates an enlarged upper left portion 10 of the display device 100. In this case, dots A of the enlarged portion 10 indicate pixels to which shapes are given, and a case where the resolution of the first display unit 110 is twice the resolution of the second display unit 120 is illustrated. With reference to FIG. 3, one pixel can be observed in a horizontal direction and a vertical direction of the second display unit 120 per two pixels in a horizontal direction and a vertical direction of the first display unit 110. Hence, in order to match the resolution of the first display unit 110 to the resolution of the second display unit 120, preferably, the pixels of the first display unit 110 are processed to form a bundled pixel B to be displayed in one pixel by forming bundles of 2×2 pixels.

As described above, after a difference in resolution between different display units is overcome, one image can be displayed in the first integrated region which integrates the display regions of the first display unit 110 and the second display unit 120, by using a known technology for displaying one image using multiple display devices.

The multiple display devices of the present invention can be used by being contiguously arranged. For example, (m−1) display devices can be further included, and m display devices can be used by being arranged in an a×b arrangement. Here, a, b, and m are natural numbers. In this case, the control unit 150 can control the m display devices to be operated in a third operation mode of displaying one image in a second integrated region which integrates at least two contiguous display regions of the respective display devices, the display devices being operated in the second operation mode. For example, when the 'preset specific event' mentioned in the description of the second operation mode occurs or a human is not detected in a close distance, the control unit 150 can control the m display devices to display one image in the second integrated region which integrates the display regions of the m display devices. In this case, a known technology for displaying one image using the multiple display devices is used as the technology for displaying one image in the second integrated region. In this respect, the image storing unit 130 can store at least one item of the second integrated image information which is to be displayed in the second integrated region.

FIGS. 4 to 7 are views for illustrating display states for respective operation modes of the display device according to the embodiment of the present invention and illustrate a screen of a game machine as an example, the game machine using eight display devices arranged in a 4×2 arrangement.

Figure 4:
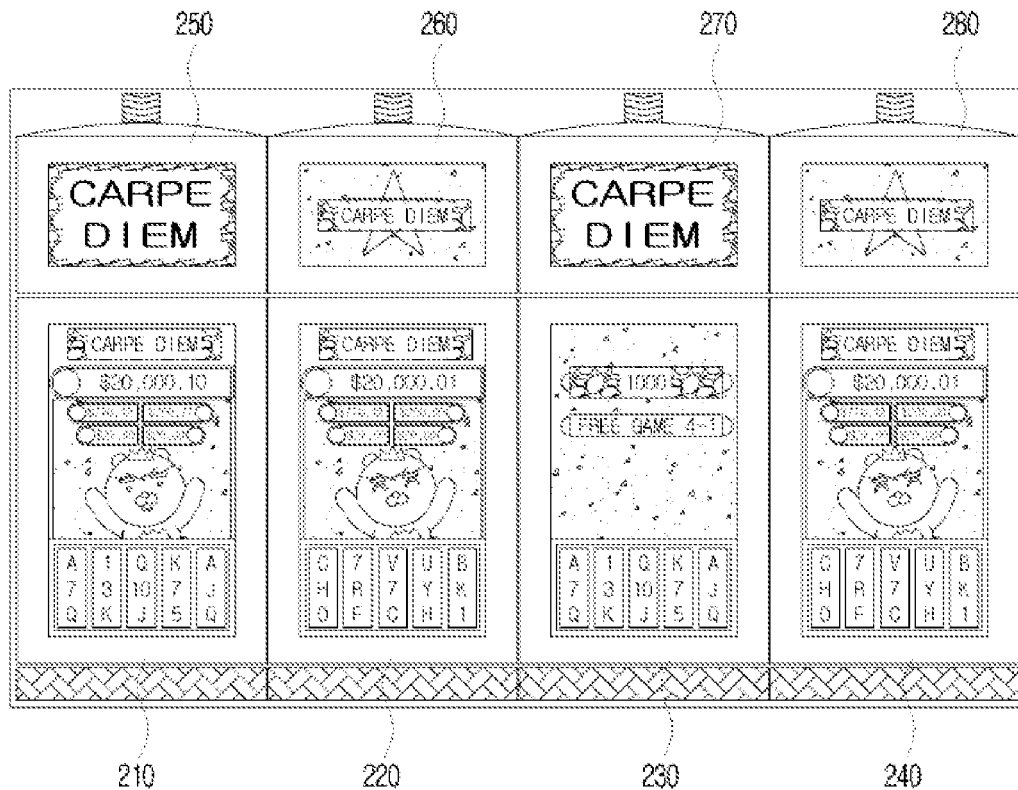
FIGS. 4 to 7 are views for illustrating display states for respective operation modes of the display device according to the embodiment of the present invention.

First, FIG. 4 illustrates an example in which the eight display devices display individual images, respectively. With reference to FIG. 4, four display devices 210 to 240 contiguously arranged on the lower side display main screens of the game machine, respectively, and four display devices 250 to 280 contiguously arranged on the upper side display topper screens of the game machine, respectively. In other words, the eight display devices 210 to 280 are all being operated in the first operation mode.

Figure 5:
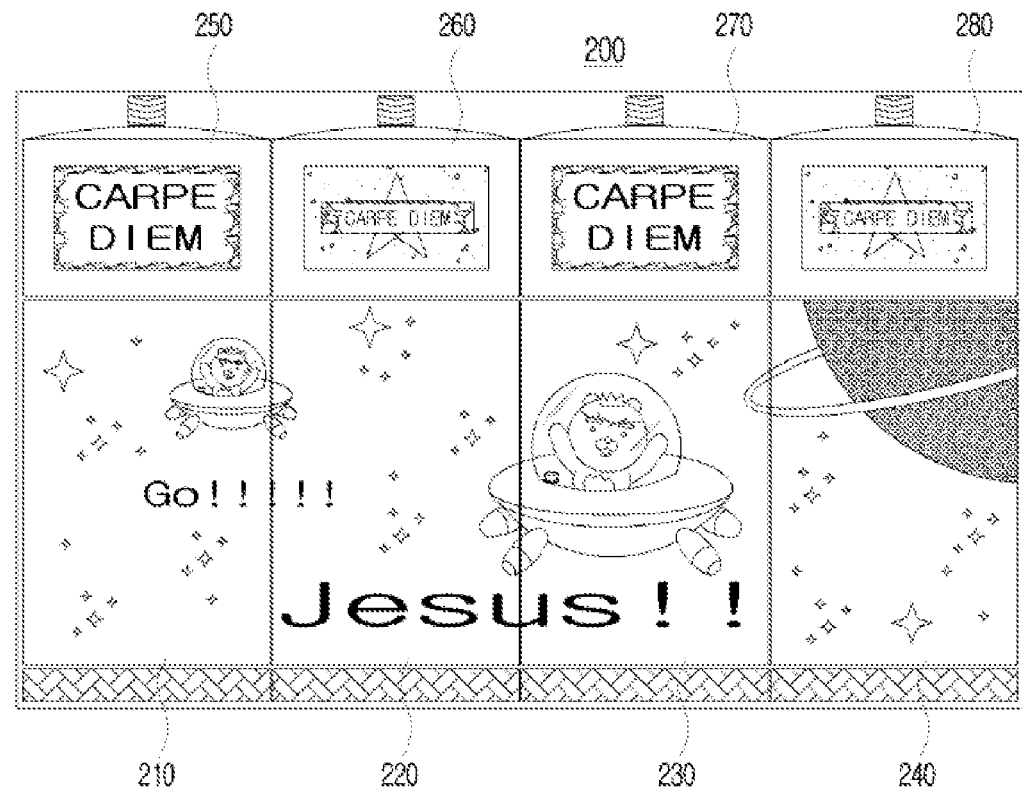
Figure 6:
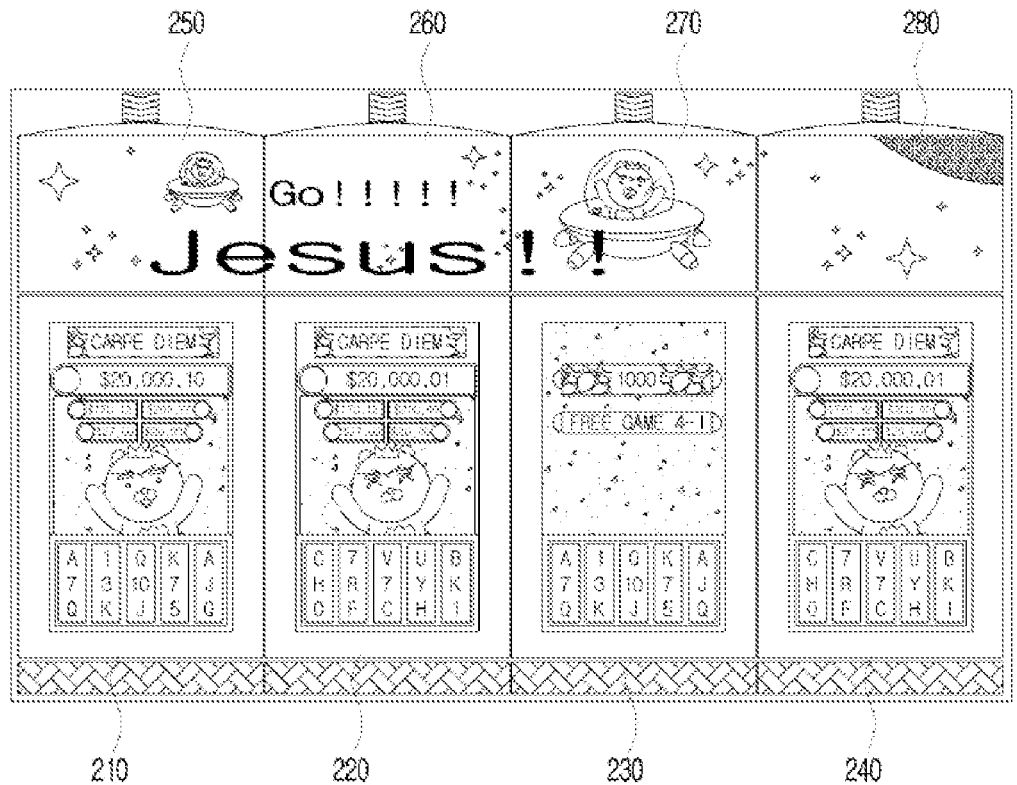

Meanwhile, FIGS. 5 and 6 illustrate examples of a case where some of the eight display devices have display regions thereof integrated to display one image, and the rest thereof display individual images, respectively. In other words, FIG. 5 illustrates an example in which the four display devices 210 to 240 contiguously arranged on the lower side display one image, and the four display devices 250 to 280 contiguously arranged on the upper side individually display topper screens of the game machine, respectively. FIG. 6 illustrates an example in which the four display devices 210 to 240 contiguously arranged on the lower side individually display main screens of the game machine, respectively, and the four display devices 250 to 280 contiguously arranged on the upper side display one image.

Here, FIGS. 5 and 6 illustrate the examples in which the display regions are divided into the upper and lower side and one image or individual images are displayed; however, the scope of the present invention is not limited to the details illustrated in FIGS. 5 and 6. For example, it can be controlled so that the two display devices 210 and 250 on the left side of the eight display devices 210 to 280 are integrated to display one image, and the rest six display devices 220 to 240 and 260 to 280 to display individual images, respectively.

Figure 7:
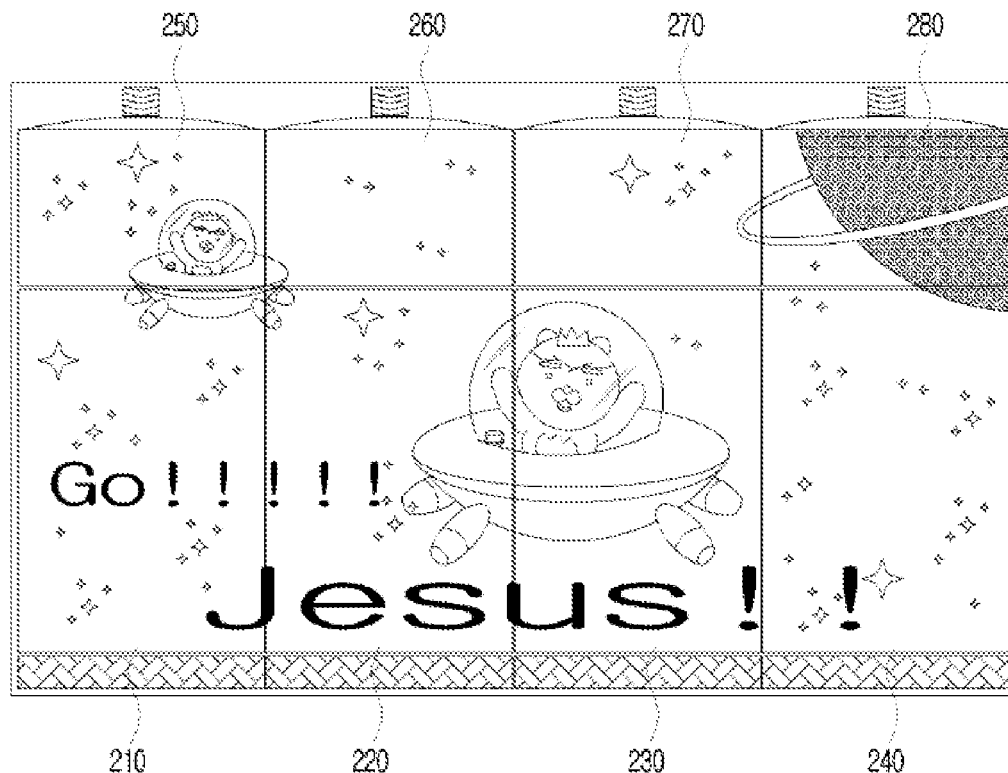

FIG. 7 illustrates an example in which the eight display devices 210 to 280 display one image, with the display regions thereof being all integrated.

In the description with reference to FIGS. 4 to 7, the display devices which display one image with the display regions thereof being all integrated are each operated in the second operation mode and operated simultaneously in the third operation mode.

In the examples illustrated in FIGS. 4 to 7, when a preset condition such as a case where the 'preset specific event' occurs or a human is not detected in a close distance is satisfied, the control unit '150' in FIG. 1 selects display devices of which display regions are integrated based on the preset information and controls the selected display devices to display one image after integrating display regions of the selected display devices. In this case, when two or more items of image information are stored in the image storing unit '130' in FIG. 1, the control unit '150' in FIG. 1 can control to sequentially or randomly select two or more items of image information every predetermined time and display the selected image information on the integrated region.

Figure 8:
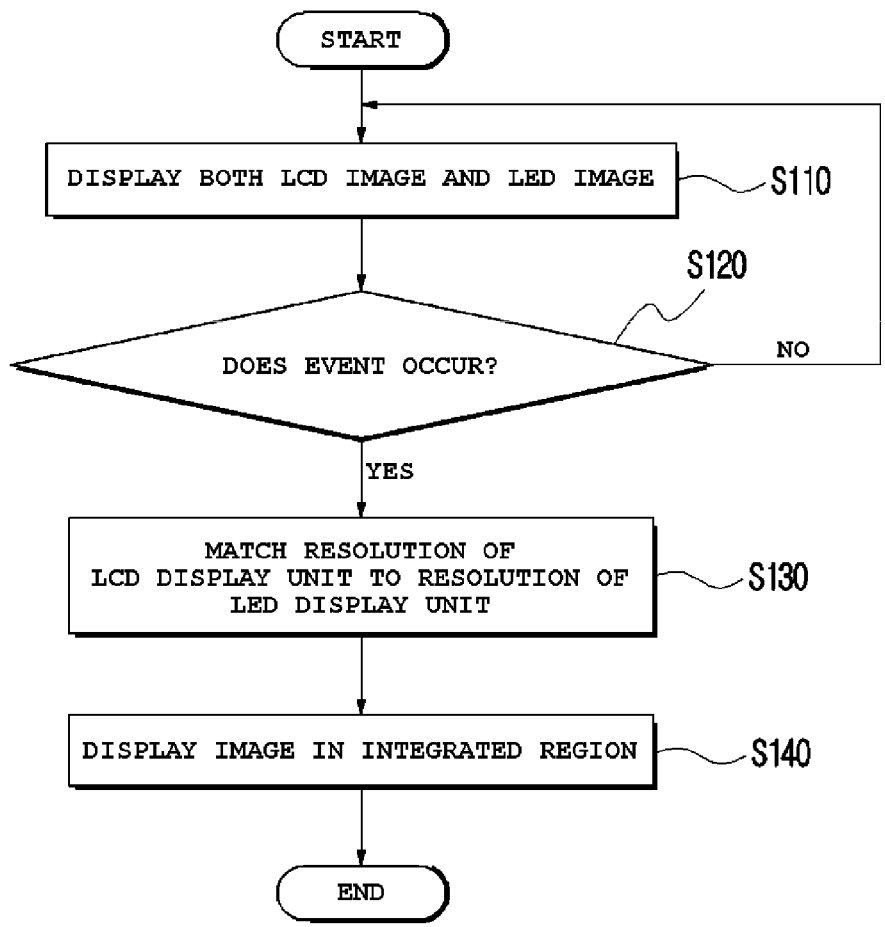
FIG. 8 is a flowchart for illustrating a processing procedure of a display control method according to another embodiment of the present invention.

FIG. 8 is a flowchart for illustrating a processing procedure of a display control method according to another embodiment of the present invention. With reference to FIGS. 1 and 8, in a control method of the display device 100 including the first and second display units 110 and 120 which display images in respective display modes different from each other, in Step S110, different images designated to the respective first and second display units 110 and 120 are displayed on the corresponding display units, respectively. For example, the control unit 150 detects different images designated to the respective first and second display units 110 and 120 from the image storing unit 130 and then controls to display the images on the corresponding display units, respectively.

In Step S120, whether or not the preset specific event occurs is monitored (S120). This step is executed to control the display device 100 to be operated in the first operation mode and display individual images, and operated in the second operation mode and display an integrated image only when the preset specific event occurs.

In this case, when the display device 100 is mounted on a game machine, the 'preset specific event' can be an event (for example, jackpot or the like) which can occur according to an operation state of a corresponding game. As a result, the display device 100 can display not a general game screen but a screen or the like for congratulating the corresponding event (for example, the jackpot or the like). In addition, the control unit 150 can control the display device 100 to be operated in the second operation mode and display an integrated image even when a human is not present at a close distance to the display device 100. As a result, when the display device 100 is mounted on the game machine, there is an effect of attracting attention of a user who passes by and causing the user to participate in a game by displaying a screen which is not a game screen (for example, a game promotion screen or the like). In this respect, preferably, the display device 100 further includes the human body detecting sensor (not illustrated) that determines whether or not a human is present in a close distance, and the control unit 150 controls the operation mode of the display device 100 based on a sensing result transmitted from the human body detecting sensor.

As a result of the monitoring of Step S120, when the preset specific event occurs, an integrated region which integrates the first and second display units 110 and 120 is set in Step S130. In other words, the integrated region is set by matching the resolution of the first display unit (that is, LCD display unit) 110 configured of the LCD mode to the resolution of the second display unit (that is, LED display unit) 120 configured of the LED mode. In this case, the control unit 150 can match the resolution by processing the pixels of the first display unit (that is, LCD display unit) 110 to form bundles based on the difference in resolution. For example, when the resolution of the first display unit 110 is n times the resolution of the second display unit 120, the control unit 150 controls the pixels of the first display unit 110 to be displayed in one pixel by forming bundles of n×n pixels. The detailed description of the bundled pixel processing is the same as mentioned in the description with reference to FIG. 3.

In Step S140, a corresponding image is displayed in the integrated region set in Step S130. To this end, the control unit 150 outputs image information by detecting the image information to be displayed in the integrated region from the image storing unit 130. In this case, when two or more items of image information are stored in the image storing unit 130, the control unit 150 can sequentially or randomly select and display the two or more items of image information every predetermined time.

In this case, when the display device includes multiple display systems which are arranged in an a×b arrangement, a step (S132) of selecting display systems which are to display one image of the two or more contiguously arranged display systems and a step (S134) of setting another integrated region which integrates integrated regions of the respective display systems in Step S132 can further be included between Step S130 and Step S140. Besides, in Step S140, preferably, one preset image is displayed in the integrated region set in Step S134.

Figure 9:
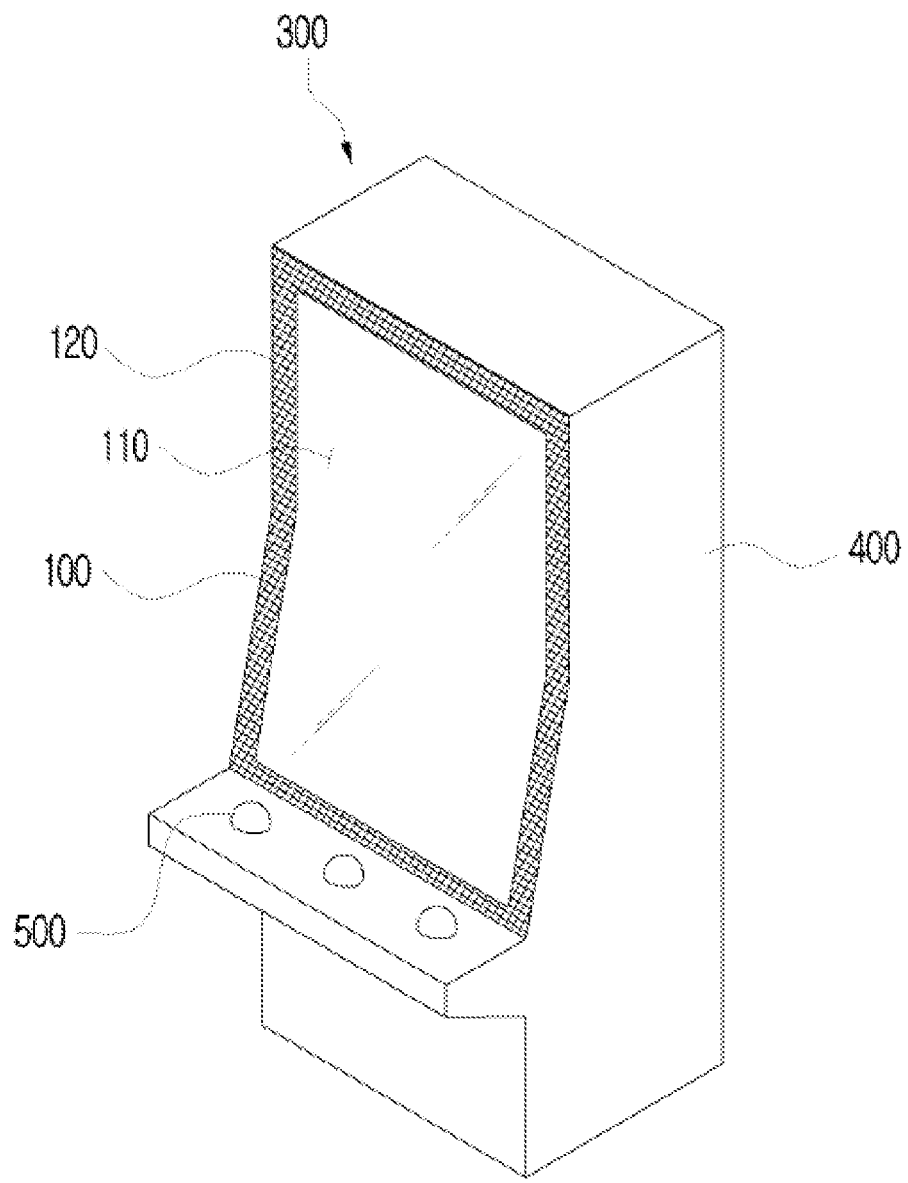
FIG. 9 is a perspective view of a game machine according to still another embodiment of the present invention.

FIG. 9 is a perspective view of a game machine according to still another embodiment of the present invention. With reference to FIG. 9, the game machine according to embodiment of the present invention includes a display device 100 including first and second display units which display images in respective display modes different from each other, an image storing unit (not illustrated) that stores at least one item of image information which is to be displayed on the display device 100, a game-machine body 400 on which the display device 100 is mounted, and a manipulation mechanism 500 that is installed in the game-machine body 400 and generates a manipulation signal for manipulating a game displayed on the display device 100. The display device 100 can be operated in one mode of a first operation mode of displaying different images designated to the respective first and second display units 110 and 120 on the corresponding display units, respectively, or a second operation mode of displaying one image in a first integrated region which integrates the first and second display units. In this case, the display device 100 can have the configurations and can fulfill the operations described with reference to FIGS. 1 to 8.

In the above-described exemplary system, the methods are described based on the flowchart as a series of steps or blocks; however, the present invention is not limited to the sequence of the steps, and a certain step can be executed in a different sequence of or simultaneously with a different step from the step described above.

In addition, those skilled in the art can understand that steps illustrated in the flowchart are not exclusive from each other, and another step can be included, or one or more steps of the flowchart can be omitted without an effect on the scope of the present invention.

The invention claimed is:

1. A display device comprising:
   a first display unit that displays an image in a first display mode;
   a second display unit that displays an image in a second display mode different from the first display mode; and
   a control unit that controls operations of the first display unit, and the second display unit in accordance with a preset control condition,
   wherein the control unit controls the display device to be operated in one mode of a first operation mode of displaying different images designated to the respective first and second display units on the corresponding first and second display units, respectively, or a second operation mode of displaying one image in a first integrated region which integrates display regions of the first and second display units,
   wherein, when resolution of the first display unit is n times the resolution of the second display unit, the control unit controls pixels of the first display unit to be displayed in one pixel by forming bundles of n×n pixels in order to control an operation to be performed in the second operation mode, wherein n is a positive integer equal to or larger than 1.

2. The display device according to claim 1,
   wherein the control unit controls an operation to be performed in the second operation mode when a preset specific event occurs.

3. The display device according to claim 1, further comprising:
   a human body detecting sensor that determines whether or not a human is present in a close distance,
   wherein the control unit controls an operation to be performed in the second operation mode when the human body detecting sensor does not detect a human.

4. The display device according to claim 1,
   wherein the first display unit displays an image in an LCD mode, and
   wherein the second display unit displays an image in an LED mode.

5. The display device according to claim 1, further comprising:
   an image storing unit that stores at least one item of image information which is to be displayed simultaneously using the first and second display units; and
   an image processing unit that detects an image which is to be displayed on the first and second display units from the image storing unit and displays the image.

6. The display device according to claim 5, further comprising:
   a (m−1) display devices,
   wherein a m display devices are arranged in an a×b arrangement, and
   wherein the control unit controls the m display devices to be operated in a third operation mode of displaying one image in a second integrated region which integrates at least two contiguous display regions of the respective display devices, the display devices being operated in the second operation mode, wherein a, b, and m are natural numbers.

7. The display device according to claim 6,
   wherein the image storing unit stores:
   one or more different individual items of image information which are to be displayed on each of the first and second display units when the display device is operated in the first operation mode; and at least one item of first integrated image information which is to be displayed in the first integrated region when the display device is operated in the second operation mode.

8. The display device according to claim 7, wherein, when the display device is operated in the second operation mode, the control unit sequentially or randomly selects two or more items of the first integrated image information every predetermined time and displays the first integrated image information in the first integrated region.

9. The display device according to claim 7, wherein, when the display device is operated in the third operation mode, the control unit sequentially or randomly selects two or more items of the second integrated image information every predetermined time and displays the second integrated image information in the second integrated region.

10. A control method of a display device including first and second display units which display images in respective display modes different from each other, the control method comprising:
  a step 1 of displaying different images designated to the respective first and second display units on the corresponding first and second display units, respectively;
  a step 2 of determining whether or not a preset specific event occurs;
  a step 3 of setting a first integrated region which integrates the first and second display units when the specific event occurs; and
  a step 4 of displaying one preset image in the first integrated region,
  wherein, when the first and second display units have different resolution from each other, the step 3 further includes a step 3-1 of processing pixels of the display unit having higher resolution to form a bundled pixel.

11. The control method of a display device according to claim 10,
  wherein, in the step 4, two or more images are sequentially or randomly selected and displayed every predetermined time.

12. The control method of a display device according to claim 10,
  when a plurality of the display devices are continuously arranged in an a×b arrangement, further comprising
  a step 5 of selecting a display system on which one image is to be displayed by integrating the first integrated regions of at least two contiguously arranged display systems;
  a step 6 of setting a second integrated region which integrates the first integrated regions of the respective selected display systems; and
  a step 7 of displaying one preset image in the second integrated region.

13. A game machine comprising:
  a display device including a first display unit and a second display unit, first and second display units displaying images in respective display modes different from each other;
  a control unit that controls operations of the first display unit and the second display unit in accordance with a preset control condition;
  an image storing unit that stores at least one item of image information which is to be displayed on the display device;
  a game-machine body on which the display device is mounted; and
  a manipulation mechanism that is installed in the game-machine body and generates a manipulation signal for manipulating a game displayed on the display device,
  wherein the display device is operated in one mode of a first operation mode of displaying different images designated to the respective first and second display units on the corresponding first and second display units, respectively, or a second operation mode of displaying one image in a first integrated region which integrates the first and second display units,
  wherein, when resolution of the first display unit is n times the resolution of the second display unit, the control unit controls pixels of the first display unit to be displayed in one pixel by forming bundles of n×n pixels in order to control an operation to be performed in the second operation mode, wherein n is a positive integer equal to or larger than 1.

14. The game machine according to claim 13, further comprising:
  a plurality of the display devices,
  wherein the display devices are vertically and contiguously arranged, and each of the display devices is operated in one mode of the first operation mode or the second operation mode.

15. The game machine according to claim 14,
  wherein, when all of the individual display devices are operated in the second operation mode, the display devices are operated in the third operation mode of displaying one image in a second integrated region which integrates the plurality of display devices.

* * * * *